United States Patent Office 2,769,960
Patented Nov. 6, 1956

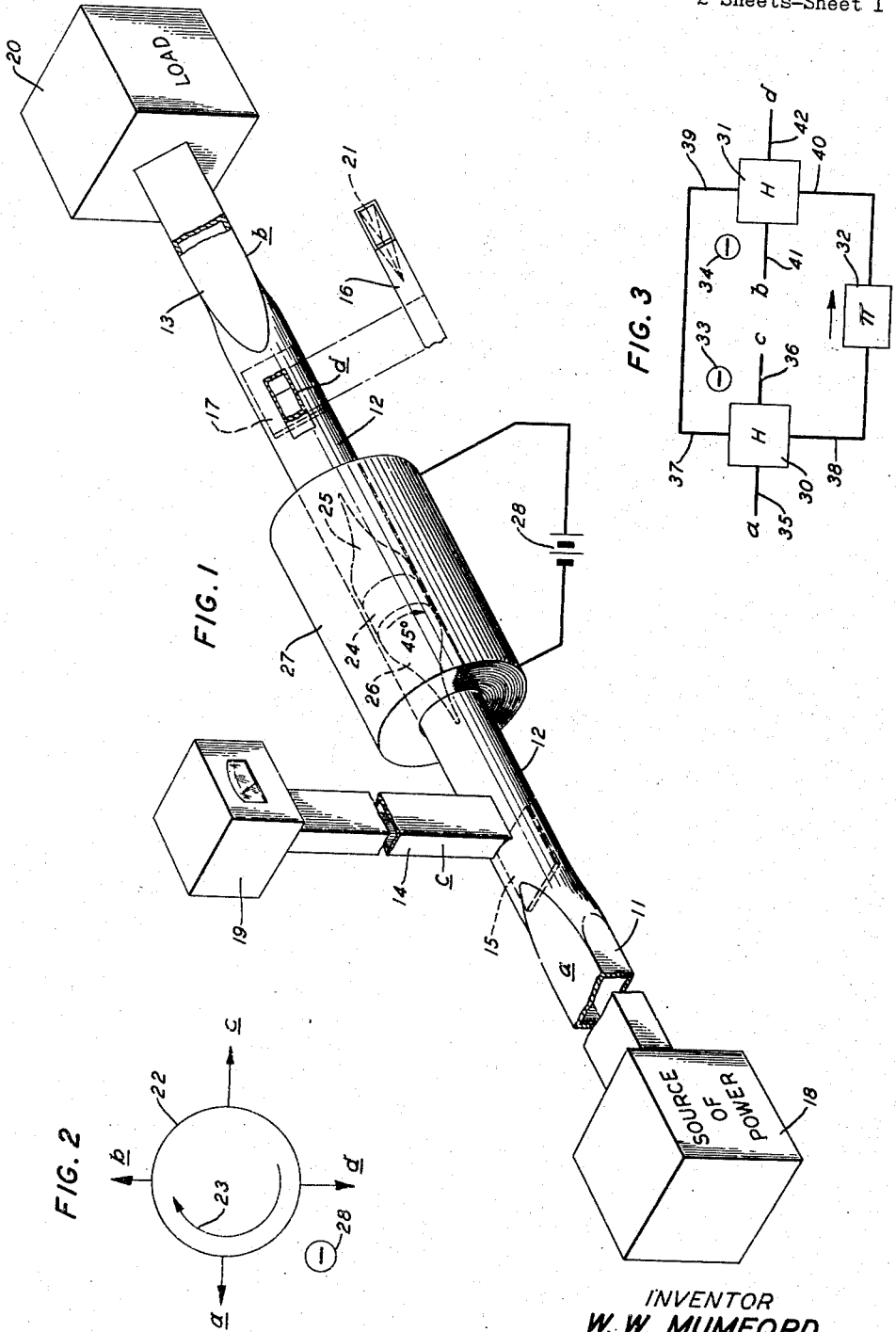

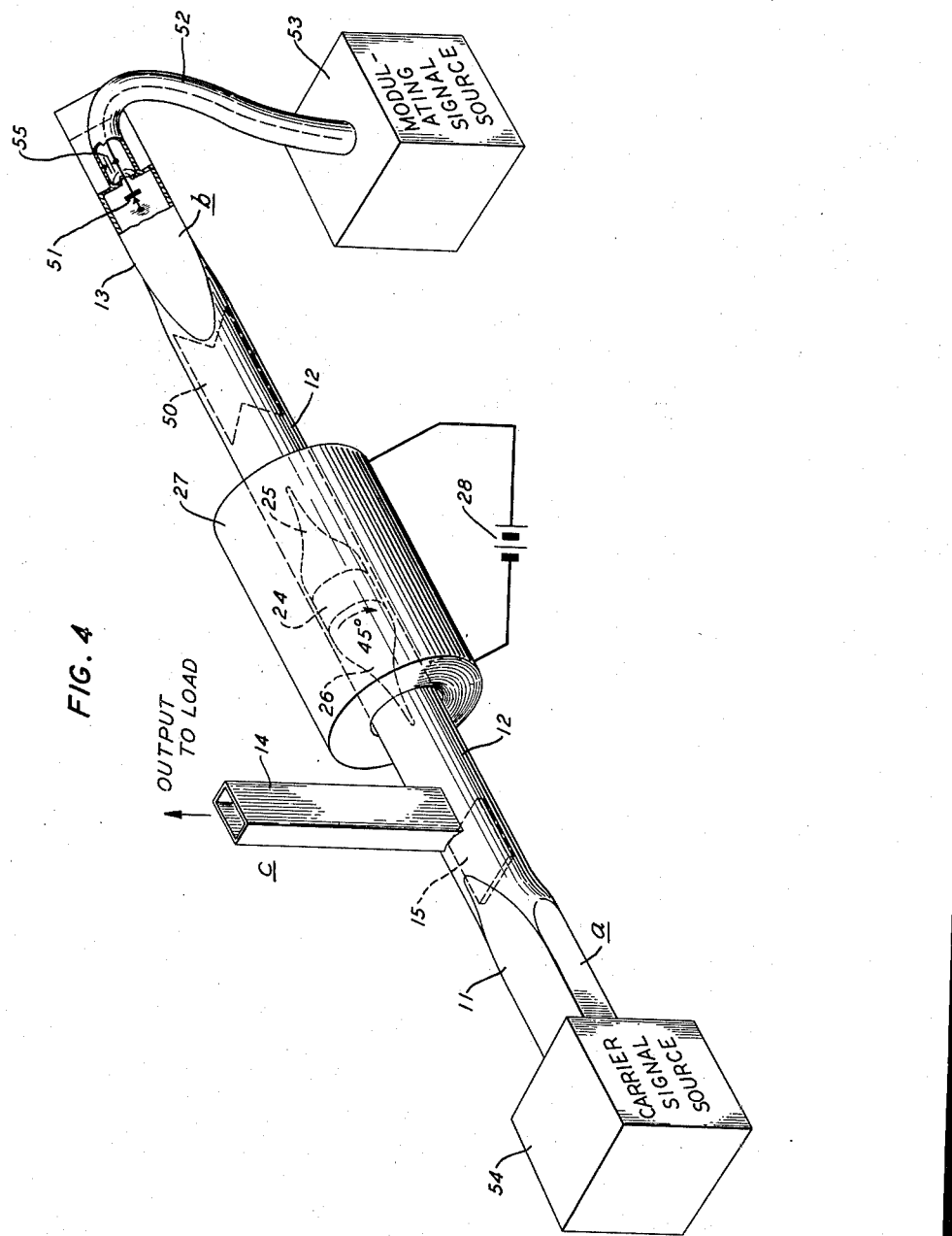

2,769,960

NON-RECIPROCAL WAVE TRANSMISSION NETWORKS

William W. Mumford, Atlantic Highlands, N. J., assignor to Bell Telephone Laboratories, Incorporated, New York, N. Y., a corporation of New York Application December 27, 1951, Serial No. 263,656

3 Claims. (Cl. 332—52)

This invention relates to electrical transmission systems and, more particularly, to multibranch circuits having non-reciprocal transmission properties for use in said systems.

It is an object of the invention to increase the sensitivity of measurements made to detect the degree of impedance match between a source of signal power and a load circuit by utilizing the non-reciprocal properties of these multibranch circuits.

Another object of the invention is to simplify apparatus required to intermodulate two signal frequencies by utilizing said non-reciprocal multibranch circuits.

One specific embodiment of a non-reciprocal multibranch network is disclosed in the copending application of C. L. Hogan, Serial No. 252,432, filed October 22, 1951, now Patent 2,748,353, issued May 29, 1956, and disclosed and claimed in the copending application of S. E. Miller, Serial No. 263,600, filed December 27, 1951, now Patent 2,748,352, issued May 29, 1956. As there disclosed, the non-reciprocal property of the multibranch network interconnecting various electrical components is supplied by a Faraday-effect element. This element rotates the polarization of the electric vector of electrical energy passing through it with respect to a plurality of spatially related branches or connecting terminals in such a way that energy appearing in one branch or terminal thereof is coupled to only one other terminal for a given direction of transmission but to another terminal for the opposite direction of transmission.

In a specific embodiment of the present invention, in accordance with the first-mentioned object hereof, a source of signal power, a load circuit and a measuring circuit are interconnected by particular branches of said multibranch network so that power from said source is delivered to said load and so that reflected power from said load is delivered to said measuring circuit. As will be shown, each of these connections are thereby made with substantially no loss of signal power whereby the circuit serves as a match-meter of greatly increased sensitivity.

The last-mentioned object of the invention can, for example, be accomplished in a specific embodiment to be hereinafter described in detail, by utilizing the directional coupling characteristics of said multibranch network in a particular combination with other circuit elements to couple a source of signal power to a non-linear modulating element and in turn to couple the non-linear element to an output circuit. Inasmuch as the signal source is, as will be shown, thereby completely isolated from the output, the necessity for the complex prior art balanced modulator configurations such as are disclosed in the copending application of C. F. Edwards, Serial No. 637,124, filed December 24, 1945, now Patent 2,679,582, issued May 25, 1954, for example, is eliminated.

Special features of the invention reside in the novel combination of non-reciprocal networks with a source of power, a load circuit, and a detector of electrical energy. Still further features of the invention reside in the novel combination of said non-reciprocal networks with two sources of signal power and a non-linear impedance element.

These and other objects and features of the invention, the nature of the present invention and its advantages, will appear more fully upon consideration of the various specific illustrative embodiments shown in the accompanying drawings and of the following detailed description of these embodiments.

In the drawings:

Fig. 1 is a perspective view of a non-reciprocal multibranch network connected pictorially in combination with other circuit elements to form a match-meter, in accordance with the invention;

Fig. 2, given for the purpose of explanation, is a diagrammatic representation of the coupling characteristics of the non-reciprocal network of Fig. 1;

Fig. 3, given for the purpose of illustration, is a diagrammatic representation of an alternative form of non-reciprocal network having characteristics similar to those illustrated in Fig. 2; and Fig. 4 shows in pictorial form a modulating system arrangement in accordance with the invention.

In more detail, Fig. 1 illustrates a match-meter comprising a non-reciprocal four branch microwave network, this network being the wave-guide structure interconnecting the four terminal connections $a$, $b$, $c$ and $d$, connected by way of terminal $a$ thereof to a source 18 of microwave signal power, connected by way of terminal $b$ thereof to a load circuit 20, and connected by way of terminal $c$ thereof to a detector 19 of electrical energy adapted to measure power reflected from load 20 due to an impedance mismatch between load 20 and source 18. Terminal $d$ of the network is terminated in a reflectionless manner by an absorbing resistance termination 21 equal to the characteristic impedance of the terminal. For convenience hereinafter and in the appended claims, the particular non-reciprocal four branch network comprising a subcombination of the match-meter of Fig. 1 will be designated as a "circulator" circuit. The applicability of this term will become immediately apparent after the electrical properties of the network circuit have been examined hereinafter.

The operation of the match-meter, the nature of the components comprising it and the manner in which these components are interconnected by the circulator to obtain the desired measurement, may most readily be explained after the nature and properties of the circulator itself are understood. Therefore, the circulator, i. e., the wave-guide structure interconnecting the terminals $a$, $b$, $c$ and $d$, will be considered for the moment as a separate circuit element without specific reference to the overall combination in which it is connected as illustrated in Fig. 1. The circulator circuit, therefore, comprises a circular wave guide 12 which tapers smoothly and gradually from its left-hand end into a rectangular wave guide 11 and which is joined near said end by a second rectangular guide 14 in a shunt or H-plane junction. The rectangular wave guides 11 and 14 will accept and support only linearly polarized plane waves in which the component of the electric vector, which determines the plane of polarization of the wave, is consistent with the dominant $TE_{10}$ mode in rectangular wave guide. Likewise, the dimension of guide 12 is preferably chosen so that only the several polarizations of the linearly polarized dominant $TE_{11}$ mode in it can be propagated. By means of the smooth transition from the rectangular cross-section of guide 11 to the circular cross-section of guide 12, the $TE_{10}$ mode, that linearly polarized wave energy having a plane of polarization parallel to the narrow dimension of the rectangular cross-section of guide 11, may be coupled to and from the linearly polarized $TE_{11}$ mode in circular guide 12 which has a similar or parallel polarization. Any other polarization of wave energy in guide 12 will not pass through the polarization-selective terminal comprising guide 11. Guide 14 is physically oriented with respect to guides 11 and 12 so that the $TE_{10}$ mode in guide 14 is coupled by way of the shunt plane junction between the rectangular cross-section of guide 14 and the circular cross-section of guide 12 into the particular $TE_{11}$ mode introduced by guide 11. Thus, guides 11 and 14 comprise a pair of polarization-selective connecting terminals by which wave energy in two orthogonal $TE_{11}$ mode polarizations may be coupled to and from one end of guide 12. Furthermore, these guides comprise a pair of conjugately related terminals or branches inasmuch as a wave launched in one will not appear in the other.

In accordance with the disclosure in the copending application of A. P. King, Serial No. 260,137, filed December 6, 1951, now Patent 2,682,610, issued June 29, 1954, a highly conductive reflecting vane 15, which may be in the order of one-half wavelength in length, is preferably diametrically disposed in circular guide 12 opposite the junction aperture of guide 14 to reflect into guide 14 those waves having their plane of polarization coincident with the plane of vane 15.

At the other end of guide 12 is a similar pair of polarization-selective conjugate terminals comprising rectangular guides 13 and 16 coupled to orthogonally related waves in guide 12 which waves are polarized in planes 45 degrees inclined to the planes of the corresponding waves, respectively, to which guides 11 and 14 are coupled. Thus, guide 12 tapers into a rectangular guide 13 which supports a linearly polarized wave polarized in a plane inclined 45 degrees with respect to the polarization of the wave in guide 11. Guide 12 is joined in a shunt plane junction by a second rectangular guide 16 which is perpendicular to both guides 12 and 13 and which will accept waves from guide 12 having a plane of polarization inclined at 45 degrees to the polarization of those waves accepted by guide 14. A highly conductive reflecting vane 17 is positioned with respect to the aperture of guide 16 and bears the same relation thereto as vane 15 to the aperture of guide 14. It is obvious to one skilled in the art that any of a number of other well-known coupling means may be employed in lieu of one or more of the wave guides 11, 13, 14 and 16 to couple to and from the proper polarizations of waves in guide 12.

Interposed between the first pair of conjugate terminals comprising guides 11 and 14 and the second pair of conjugate terminals comprising guides 13 and 16 in the path of wave energy passing therebetween in guide 12 is suitable means of the type which produces an antireciprocal rotation of the plane of polarization of these electromagnetic waves, for example, a Faraday-effect element having such properties that an incident wave impressed upon a first side of the element emerges on the second side polarized at a different angle from the original wave and an incident wave impressed upon the second side emerges upon the first side with an additional rotation of the same angle. Thus, the polarization of a wave passing through the element first in one direction and then in the other undergoes two successive space rotations or space phase shifts in the same sense, thereby doubling the rotation undergone in a single passage. As illustrated by way of example in the drawing, this means comprises a Faraday-effect element 24 with accompanying conical transition members 25 and 26 which may be of polystyrene and are provided to cut down reflections from the faces of element 24, mounted inside guide 12 approximately mid-way between the conjugate pairs. As a specific embodiment, element 24 may be a block of magnetic material, for example nickel-zinc ferrite prepared in the manner disclosed in said copending application of C. L. Hogan, having a thickness of the order of magnitude of a wavelength. This material has been found to operate satisfactorily as a directionally selective Faraday-effect rotator for polarized electromagnetic waves to an extent up to 90 degrees or more when placed in the presence of a longitudinal magnetizing field of strength which is readily produced in practice and in such thickness is capable of transmitting electromagnetic waves, for example in the centimeter range, with substantially negligible attenuation. Suitable means for producing the necessary longitudinal magnetic field surrounds element 24 which means may be, for the purpose of illustration, a solenoid 27 mounted upon the outside of guide 12 and supplied by a source 28 of energizing current. It should be noted, however, that element 24 may be permanently magnetized or element 27 can be a permanently magnetized structure. The angle of rotation of polarized electromagnetic waves in such magnetic material is approximately directly proportional to the thickness of the material traversed by the waves and to the intensity of the magnetization to which the material is subjected, whereby it is possible to adjust the amount of rotation by varying or properly choosing the thickness of the material comprising element 24 and the intensity of magnetization supplied by solenoid 27.

In the simplified view of the phenomenon involved as offered in said Hogan application a plane polarized wave incident upon the magnetic material in the presence of the magnetic field produces two sets of secondary waves in the material, each set of secondary waves being circularly polarized. The two sets of secondary waves are circularly polarized in opposite senses and they travel through the medium at unequal speeds. Upon emergence from the material the secondary waves in combination set up a plane polarized wave, which is in general polarized at a different angle from the original wave. It should be noted that the Faraday rotation depends for its direction upon the direction of the magnetic field. Thus, if the direction of the magnetic field is reversed, the direction of the Faraday rotation is also reversed in space while retaining its original relationship to the direction of the field.

The operation of the circulator circuit of Fig. 1 may be conveniently explained with reference to the diagram of Fig. 2. Thus, a vertically polarized wave introduced at terminal $a$ into guide 11 travels past the aperture of guide 14 and its associated vane 15 unaffected thereby inasmuch as the effective polarization of these components is perpendicular to the polarization of the wave, and past transition member 26, to element 24. The thickness of element 24 and the potential from source 28 are adjusted, as pointed out hereinbefore, to give a 45 degree rotation of the plane of polarization in the same direction as the angle existing between the first pair of terminals comprising guides 11 and 14 and the second pair of terminals comprising guides 13 and 16. Thus, as shown on Fig. 1, the polarization of the wave is rotated 45 degrees in a clockwise direction, as indicated by the arrow on element 24 in the drawing, thereby bringing the plane of polarization of the wave into the preferred direction for transmission unaffected past guide 16 and into the preferred polarization for passage through guide 13 to terminal $b$. Substantially free transmission is therefore afforded from terminal $a$ to terminal $b$ and this condition is indicated on Fig. 2 by the radial arrows labeled $a$ and $b$, respectively, associated with a ring 22, and an arrow 23 diagrammatically indicating progression in the sense from $a$ to $b$.

Should a wave having the same polarity as the wave heretofore described as leaving terminal $b$ by guide 13, be applied to guide 13, it will be transmitted unaffected past the conjugate guide 16 to element 24. This wave will be rotated 45 degrees by element 24 in the direction of the arrow thereon, bringing the wave into a horizontal polarization at the aperture of guide 14 into which it will be reflected by vane 15 for passage to terminal $c$. This transmission is indicated by arrow 23 on Fig. 2 which tends to turn the arrow *b* in the direction of the arrow *c*.

Should a wave having the same polarity as the wave heretofore described as leaving terminal *c* by guide 14, be applied to guide 14, it will be launched in guide 12 in a polarization conjugate to guide 11 and will travel to element 24. Element 24 again rotates its polarization 45 degrees in the direction of the arrow, bringing the wave into the preferred polarization for passage by guide 16 to terminal *d*. This transmission is indicated by the arrow 23 on Fig. 2 which tends to turn the arrow *c* in the direction of the arrow *d*. Similarly, if a wave having the same polarization as the wave heretofore described as leaving terminal *d* by guide 16, is applied to guide 16, it will be launched in guide 12 in a polarization conjugate to guide 13 and will travel to element 24, where it receives a further 45 degree rotation in the direction of the arrow, bringing its plane of polarization into the preferred direction for transmission through guide 11 to terminal *a*. This passage is similarly indicated on Fig. 2 by the schematic coupling between the terminals *d* and *a*.

Assuming an initial polarization of the wave as that in guides 11 and 13 for the passage from terminal *a* to *b*, in guide 14 after the passage from terminal *b* to *c*, and in guide 16 after the passage from terminal *c* to *d*, it will be seen that on passage from terminal *d* to *a*, the wave leaving guide 11 has been inverted or has experienced a phase shift of 180 degrees with respect to the assumed initial polarization. This phase inversion is indicated on Fig. 2 by a minus sign 28 in the quadrant between arrows *d* and *a*.

Considering the above-described transmission characteristics as they are indicated diagrammatically on Fig. 2, the applicability of the term "circulator" as a descriptive name for the non-reciprocal four terminal network of Fig. 1 is apparent. Transmission of waves at *a* takes these waves in circular fashion to terminal *b*, transmission from *b* leads to terminal *c*, transmission from *c* leads to terminal *d*, and transmission from terminal *d* leads to terminal *a*. Thus, each terminal is coupled around the circle to only one other terminal for a given direction of transmission, but to another terminal for the opposite direction of transmission.

Considering this transmission from a different aspect, it will be seen that terminals *a* and *c* are initially conjugate to each other and that terminals *b* and *d* are likewise initially conjugate to each other. Element 24 introduces such a value of directional space phase shift that terminal *a* is in coupling relationship to terminal *b* for the direction of transmission from *a* to *b* and in conjugate relationship to terminal *d* for the direction of transmission from *a* to *d*. Inherently, therefore, terminal *c* is in coupling relationship to terminal *d* for the direction of transmission from *c* to *d*, and in conjugate relationship for the direction of transmission from *c* to *b*. Similar relationships of unidirectional coupling and conjugacy exist in transmission from terminals *b* and *d* to terminals *a* and *c*.

In the preceding discussion, attention has been directed primarily to the circulator of Fig. 1 by considering it principally as a four terminal wave-guide network having unusual internal non-reciprocal connections between its terminals. Consideration will now be given to the novel match-meter application thereof, comprising the circulator in combination, as illustrated on Fig. 1, with a source of power 18, a load 20 and a detector 19. The nature of the last-named three elements and their respective connections to terminals *a*, *b* and *c* of the circulator have been defined hereinbefore.

Heretofore, the degree of impedance match between a source of signal power and a load circuit has been measured by inserting a conventional hybrid junction structure or a conventional directional coupler structure between the source and the load and measuring the reflected power as it is sampled by the inserted structure. Inasmuch as either the hybrid junction or the directional coupler inherently introduces at least a three decibel loss to power flowing from the generator to the load, and at least a second three decibel loss to the reflected power between the load and the measuring instrument, the sensitivity of the measurement is reduced by a total of six decibels.

In the specific measuring system shown in Fig. 1, however, power delivered from source 18 to terminal *a* of the circulator appears at terminal *b* and load 20 with substantially no loss, and none of this power is diverted to terminals *c* and *d*. A reflected wave from load 20 appears then only at terminal *c* for measurement by detector 19, also suffering negligible loss. The sensitivity of the match-meter is therefore increased by six decibels over the conventional system. Furthermore, none of the power reflected by load 20 ever reaches source 18 since even if detector 19 is not properly matched to guide 14, energy reflected from the resulting impedance discontinuity would be absorbed in termination 21 of terminal *d*. Thus, there is no possibility of the reflected power pulling the oscillator frequency of source 18 away from its standard frequency even if relatively large mismatches exist at any of the active arms of the match-meter.

Fig. 3 illustrates schematically another embodiment of the circulator circuit which may be substituted in Fig. 1 for the circulator portion thereof to obtain a match-meter having properties identical to those already described. In making such a substitution, terminal *a* of Fig. 3 is connected in place of terminal *a* of Fig. 1 to source 18, terminal *b* of Fig. 3 is connected in place of terminal *b* of Fig. 1 to load 20, terminal *c* of Fig. 3 is connected in place of terminal *c* of Fig. 1 to detector 19, and terminal *d* of Fig. 3 is terminated in a reflectionless manner.

The details of the circulator in Fig. 3 are disclosed and claimed with reference to Fig. 9 of the aforementioned copending application of C. L. Hogan. Briefly, the circulator of Fig. 3 comprises a first hybrid structure 30 and a second hybrid structure 31, both of which may be wave-guide hybrid junctions of the types illustrated and described, for example, in the Proceedings of the Institute of Radio Engineers, vol. 35, November 1947, pages 1294–1306. Whatever form of hybrid is employed, it should have two pairs of conjugately related terminals, such as 35 and 36, and 37 and 38 of hybrid 30, and 41 and 42, and 39 and 40 of hybrid 31. These terminals are so phased that energy applied, for example, to hybrid 30 by terminal 35 of the first pair will divide in phase in the terminals 37 and 38 of the second pair thereof, while energy applied to the terminal 36 of the first pair will divide out of phase in terminals 37 and 38 of the second pair, as represented diagrammatically by the minus sign 33 between terminals 36 and 37. The same properties and the reciprocal relationships thereof also apply to corresponding terminals of hybrid 31 with the corresponding out of phase relationships represented diagrammatically by the minus sign 34 between terminals 39 and 44. The aforementioned properties of hybrid structures are so well known in the art as to require no further description here. Terminal 37 of hybrid 30 is directly connected to terminal 39 of hybrid 31. Terminal 38 of hybrid 30 is connected to terminal 40 of hybrid 31 through means introducing a directional 180 degree phase shift or a phase inversion. This means is diagrammatically represented on Fig. 3 by element 32, which inverts that energy only passing through element 32 in the direction of the arrow above it. Element 32 may be, for example, the combination illustrated in said Hogan application comprising a Faraday-effect element producing a 90 degree antireciprocal phase rotation followed by a 90 degree wave-guide twist producing a reciprocal 90 degree rotation.

In operation of the circulator of Fig. 3, wave energy applied at *a* to terminal 35 divides in phase in terminals 37 and 38. The wave energy in 38 receives a phase inversion as indicated by the arrow on element 32 thereby producing an out of phase relation between energy in 39 and 40, which causes these components to combine in terminal 41 of hybrid 31 to appear at *b*. Wave energy applied at *b* to terminal 41 of hybrid 31 appears relatively out of phase in 39 and 40 and remains out of phase in 37 and 38 so that the two components combine in terminal 36 of hybrid 30 to appear at *c*. By similar analysis, energy applied to terminal *c* appears at *d*, and energy applied at *d* appears at *a*. This transmission of energy will be recognized as being identical to that schematically illustrated by Fig. 2 with the exception that no phase inversion is experienced in the connection from *d* to *a*.

Thus, when the circulator of Fig. 3 is substituted in the match-meter of Fig. 1, wave power from source 18 of Fig. 1, applied to terminal *a* of Fig. 3, will appear in terminal *b*, and without appreciable loss be applied to load 20 of Fig. 1. The reflected wave from load 20 of Fig. 1, applied to terminal *b* of Fig. 3, will appear in terminal *c* and without loss, be applied to detector 19 of Fig. 1 for measurement. The same advantages, therefore, obtain for a measuring system embodying the circulator of Fig. 3 as have been described for the measuring system of Fig. 1.

Fig. 4 illustrates a novel combination of the circulator with two sources of signal frequency power and a non-linear element whereby the two signals may be intermodulated. The circulator portion of Fig. 4, i. e., the waveguide structure interconnecting the terminals *a*, *b* and *c*, is essentially the same as the circulator portion of Fig. 1 and corresponding components have been given corresponding reference numerals. The principal modification which is disclosed and claimed in said copending application of S. E. Miller is seen to reside in the manner in which that wave energy in the right-hand portion of guide 12 which is polarized perpendicular to the effective plane of polarization of wave energy in guide 13, is dissipated. Reference to Fig. 1 would indicate that wave energy in this polarity was therein transferred from guide 12 into guide 16 constituting terminal *d* and thereafter dissipated in termination 21. In Fig. 4, however, a vane 50 of resistive material, several wavelengths long, is diametrically disposed in guide 12 in the plane of wave energy to be dissipated. In accordance with usual practice, the ends of vane 50 may be tapered to prevent undue reflection of energy from the edges thereof. It is apparent that such a vane might be substituted for the terminated guide 16 and its associated components in the match-meter of Fig. 1, if desired, or that the Fig. 1 arrangement may be employed in the modulator of Fig. 4 in place of vane 50.

A source 54 of the carrier signal to be modulated is connected to guide 11, which constitutes terminal *a* of the circulator. Connected to be effective for the wave energy in guide 13, which constitutes terminal *b* of the circulator, is a non-linear impedance element 51 which can be a crystal detector of silicon or like material, or any other non-linear device having an impedance range which is appropriate to permit the matching of the impedance of the element to the impedance of practical wave guides. Element 51 is also connected by suitable means to the source 53 of the intelligence bearing modulating signal to be impressed upon the carrier signal. Specifically, as illustrated in the drawing, element 51 is mounted within wave guide 13 and extends across the narrow dimension thereof. One terminal of element 51 may be connected directly to the wall of guide 13. The other terminal extends through a small aperture in the opposite wall of guide 13 and is connected to the center conductor of coaxial line 52, of which the outside conductor is directly connected to guide 13. The opposite end of line 52 is connected to source 53. A capacitor 55 having a low reactance at the carrier frequency and a high reactance at the modulating signal frequency is connected across coaxial line 52 at a point slightly outside guide 13. The right-hand end of guide 13 is closed. The distance from the closed end of guide 13 to element 51, the relation of element 51 to the longitudinal center line of guide 13, and the position of capacitor 55 along the length of coaxial line 52 are adjusted in accordance with well-known principles so that the impedance of element 51 is matched both to the impedance of guide 13 at the operating frequency and amplitude of the carrier signal and to the impedance of coaxial line 52 at the mean frequency and mean amplitude of the modulating signal. When the sinusoidal wave of the modulating voltage from source 53 is applied to element 51, the instantaneous impedance of element 51 is varied in response thereto since the bias current of element 51 is instantaneously varied in response to the modulating signal current.

Therefore, when the linearly polarized carrier energy from source 54 is rotated by element 24 into the effective plane of crystal 51, a modulated wave is reflected back along guide 13 to element 24 which reflected wave is roughly proportional to the instantaneous degree of mismatch between element 51 and guide 13 which results from the effect of the modulating signal. Element 24 rotates the polarity of the reflected modulated wave into the preferred direction for transmission out guide 14 to be delivered by terminal *c* of the circulator to the useful load. Inasmuch as none of this modulated wave power can reach source 54, there is no need for the particular balancing schemes required by the prior art modulators. Regardless of the amplitude of the modulating signal from source 53, carrier source 54 is always presented with a perfect impedance match and the frequency thereof cannot be pulled or varied by the frequency of the modulating signal or by variations in the impedance of the output load. It should be noted that sources 53 and 54 may be interchanged, i. e., the modulating signal may be applied to terminal *a* and the carrier signal to element 51, without altering the basic modulating operation. Thus, the signal source, whether carrier or intelligence, most likely to be adversely affected by components of the wave energy reflected from an improper impedance match, may be connected to terminal *a* of the circulator.

The circulator of Fig. 3, described above, may be substituted in Fig. 4 for the circulator portion thereof to obtain a modulating system having properties identical to those described. In making such a substitution, terminal *a* of Fig. 3 is connected in place of terminal *a* of Fig. 4 to source 54, terminal *b* of Fig. 3 is connected in place of terminal *b* of Fig. 4 to element 51, terminal *c* of Fig. 3 is connected to the output load, and terminal *d* of Fig. 3 is terminated in a reflectionless manner.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. Modulating apparatus comprising a section of wave guide adapted to support electromagnetic wave energy in a plurality of linear polarizations, a pair of polarization-selective connections at one location along said guide each coupled to an orthogonal polarization of linearly polarized wave energy at said location, a source of linearly polarized carrier energy connected to one of said connections, a load circuit connected to the other of said connections, a polarization-selective connection at another location along said guide coupled to a polarization of linearly polarized wave energy therein related by an angle to the polarization of said one connection at said one location, a source of modulating energy, a non-linear impedance coupling said modulating source exclusively to said linearly polarized energy in said connection at said other location, and a ferromagnetic element producing a Faraday-effect rotation of polarization of said energy interposed in said guide between said locations and having an angle of rotation equal to said angle.

2. In combination, a section of wave guide, a source of linearly polarized wave energy coupled at one end of said guide to a first plane of wave energy polarization in said guide, means for receiving and utilizing said wave energy coupled at said end to a plane of polarization orthogonal to said first plane, a single conductive path including a non-linear impedance extending transversely across said guide, said path lying in another plane of linear polarization at the other end of said guide, said other plane being different from said first plane and said orthogonal plane, a second source of wave energy coupled to said non-linear impedance, a wave transmission medium interposed in the path of wave energy between said ends, and a magnetic field applied to said medium whereby said medium produces an antireciprocal rotation of wave energy polarization such that energy from said source is rotated into the plane to which said non-linear impedance is coupled.

3. Apparatus for modulating an electromagnetic wave carrier signal with an intelligence bearing signal, said apparatus comprising first and second sections of wave guide adapted to support linearly polarized wave energy in a plurality of polarizations, a ferromagnetic element connecting said sections for producing a Faraday effect rotation of the polarization of said energy which passes between said sections, a source of said carrier wave signals coupled to a given one of said polarizations in said first section, means for reflecting in response to said intelligence bearing signal the linearly polarized waves in said second section that are polarized at an acute angle to said one polarization, said means comprising a non-linear impedance element with the source of said intelligence signal being connected to said impedance element to supply to it a variable bias current, and a load circuit to receive said reflected energy coupled to a polarization in said first section that is orthogonal to said given one of said polarizations.

References Cited in the file of this patent
UNITED STATES PATENTS

| | | |
|---|---|---|
| 2,458,579 | Feldman | Jan. 11, 1949 |
| 2,606,248 | Dicke | Aug. 5, 1952 |
| 2,644,930 | Luhrs et al. | July 7, 1953 |